(12) United States Patent
Eskicioglu et al.

(10) Patent No.: US 8,768,369 B2
(45) Date of Patent: Jul. 1, 2014

(54) NETWORK MAP FOR LOCATION-BASED MOBILITY DECISIONS

(75) Inventors: Suat R. Eskicioglu, Ottawa (CA); Csaba Marton, Ottawa (CA); Allan Ding, Ottawa (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/564,065

(22) Filed: Aug. 1, 2012

(65) Prior Publication Data

US 2014/0038634 A1   Feb. 6, 2014

(51) Int. Cl.
*H04W 40/00* (2009.01)

(52) U.S. Cl.
USPC ......... 455/446; 455/456.5; 455/418; 370/352

(58) Field of Classification Search
USPC .................. 455/446, 456.5, 418; 370/352
See application file for complete search history.

(56) References Cited

U.S. PATENT DOCUMENTS

| | | | |
|---|---|---|---|
| 5,867,786 A * | 2/1999 | Ishi | 455/436 |
| 5,966,658 A * | 10/1999 | Kennedy et al. | 455/426.1 |
| 6,463,287 B1 | 10/2002 | Wegner | |
| 6,519,452 B1 | 2/2003 | Agostino et al. | |
| 6,850,764 B1 | 2/2005 | Patel | |
| 7,236,767 B1 | 6/2007 | Cankaya et al. | |
| 2002/0180618 A1 * | 12/2002 | Beri et al. | 340/988 |
| 2006/0203793 A1 | 9/2006 | Li et al. | |
| 2007/0082690 A1 * | 4/2007 | Fabien et al. | 455/518 |
| 2007/0143483 A1 * | 6/2007 | Lim et al. | 709/227 |
| 2007/0268959 A1 | 11/2007 | Bi et al. | |
| 2009/0201871 A1 * | 8/2009 | Sambhwani et al. | 370/329 |
| 2010/0253506 A1 * | 10/2010 | Teran-Matus et al. | 340/539.13 |
| 2010/0261490 A1 | 10/2010 | Berry et al. | |
| 2010/0297979 A1 | 11/2010 | Watfa et al. | |
| 2011/0164580 A1 | 7/2011 | Keon | |
| 2011/0177831 A1 * | 7/2011 | Huang | 455/457 |
| 2012/0142343 A1 | 6/2012 | Wohld | |
| 2013/0165142 A1 * | 6/2013 | Huang | 455/456.1 |

FOREIGN PATENT DOCUMENTS

| | | |
|---|---|---|
| CA | 2829215 | 9/2012 |
| EP | 1 830 596 | 9/2007 |
| WO | WO 2007/121375 | 10/2007 |
| WO | WO 2012/154112 A1 | 11/2012 |

OTHER PUBLICATIONS

3rd Generation Partnership Project; Technical Specification Group Radio Access Network; Evolved Universal Terrestrial Radio Access Network (E-UTRAN); Architecture description (Release 10), 3GPP TS 36.401, V10.3.0 (Sep. 2011), pp. 1-20.

3rd Generation Partnership Project; Technical Specification Group Radio Access Network; UTRAN overall description (Release 10), 3GPP TS 25.401, V10.2.0 (Jun. 2011), pp. 1-54.

(Continued)

*Primary Examiner* — Danh Le
(74) *Attorney, Agent, or Firm* — Fay Sharpe LLP

(57) ABSTRACT

The exemplary embodiment uses geographical location information to assist the selection of the target cell during reconfiguration, handover and redirection procedures. This process involves defining a network geographical grid and building an associated database of captured data from the user equipment, such as radio measurements, and calculated KPI statistics per geographical location, and then using such data for making mobility and load-balancing decisions.

19 Claims, 3 Drawing Sheets

(56) References Cited

OTHER PUBLICATIONS

3rd Generation Partnership Project; Technical Specification Group Services and System Aspects; Universal Geographical Area Description (GAD) (Release 10), 3GPP TS 23.032, V10.0.0 (Mar. 2011), pp. 1-29.

International Search Report dated Nov. 26, 2013.

International Search Report dated Dec. 5, 2013 (received in related U.S. Appl. No. 13/633,287).

* cited by examiner

NETWORK MAP FOR LOCATION-BASED MOBILITY DECISIONS

BACKGROUND OF THE INVENTION

This invention relates to a method and apparatus that correlates geographical location information of user equipment with data relating to a network map to assist in the selection of a target cell during handover and redirection procedures. While the invention is particularly directed to the art of wireless telecommunications, and will be thus described with specific reference thereto, it will be appreciated that the invention may have usefulness in other fields and applications.

By way of background, in the field of wireless telecommunications, such as cellular telephony, a system typically includes a plurality of base stations distributed within an area to be serviced by the system. Various users within the area, fixed or mobile, may then access the system and, thus, other interconnected telecommunications systems, via one or more of the base stations. Typically a user maintains communications with the system as the user passes through an area by communicating with one and then another base station, as the user moves. The user may communicate with the closest base station, the base station with the strongest signal, the base station with a capacity sufficient to accept communications, etc.

Quality of Experience (QoE) for the users in wireless networks is important to network operators because it is one of the elements that attracts, and helps keep, subscribers and also builds customer loyalty. To keep the Quality of Experience at its highest level, wireless network operators pay specific attention to optimizing the network resource usage, particularly the radio spectrum usage, which is a scarce and expensive resource.

To support the wide penetration of smartphones and the high throughput demands from their end users, many wireless network operators have deployed the Long Term Evolution (LTE) standard in addition to their existing Wideband Code Division Multiple Access (W-CDMA or WCDMA) and Global System for Mobile Communications (GSM) networks. In many parts of their networks, more than one carrier frequency has been deployed for W-CDMA and LTE networks to support high throughput, optimum Quality of Experience, and the always-on demands from an extensive number of subscribers. In other words, both capacity and Quality of Experience demands from subscribers forced the wireless network operators to deploy a number of W-CDMA and LTE carrier frequencies to meet these demands while utilizing their full radio spectrum.

In such an environment, the challenge for the wireless network operators is to fully utilize the radio spectrum and network resources by balancing the load among different technologies and/or different carrier frequencies within each technology while maintaining the Quality of Experience for the end users, as defined, for example, by various network Key Performance Indicators (KPI).

Thus, one issue is how to select the best cell and technology to make use of all available resources efficiently while also providing the subscribers an optimal Quality of Experience. Of course, this must be accomplished in a complex network deployment scenario where many carrier frequencies among different technologies have been deployed. As an example, a wireless operator may deploy in their network eight carrier frequencies among different technologies, e.g., two LTE, five W-CDMA and one GSM carrier frequencies. Each of the unique technology and carrier frequency pairs is defined as a layer. In this example, one can say that the network has eight layers.

Accordingly, there is a need for a method of selecting the most suitable cell in a complex network deployment, for example, when as much as eight carrier frequencies have been deployed between all relevant technologies. Selection of the most suitable cell requires relevant data available in a more granular form than on a per cell basis, especially the data that changes depending on the location of the user in the cell, such as radio conditions.

SUMMARY OF THE INVENTION

The exemplary embodiment uses the information at the geographical location of the user equipment to assist in the selection of the target cell during reconfiguration, handover and redirection procedures. This process involves building a geographical grid that is logically overlaid on a cellular network and an associated database to capture radio measurements and calculate KPI statistics per geographical location, and then using this data for mobility and load-balancing decisions.

In one embodiment, a method of processing cellular network communications is provided. The method includes creating a geographical grid covering two or more layers in a cellular network, wherein a layer is defined as a unique combination comprising a cellular technology paired with a carrier frequency and the geographical grid is divided into a plurality of grid-zones. Data is collected for each of the layers within the cellular network grid from a plurality of user equipments and stored in a network map database. Geographical location information for a particular user equipment is obtained. The geographical location information for the particular user equipment is mapped to a particular grid-zone in the geographical grid. At least one location-dependent decision criterion is refined, based on the data stored in the database for the particular grid-zone, wherein the criterion is for selecting a target cell of a particular cellular technology and/or for selecting a particular carrier frequency.

Optionally, with regard to the preceding embodiment, the cellular network technologies may comprise Wideband Code Division Multiple Access and/or 4G Long Term Evolution. Further, the data collected may include radio measurements and historical network key performance indicator (KPI) statistics on a per grid-zone basis per technology and carrier frequency. In addition, the method may further include adding an additional location parameter in one or more signaling messages to carry the location information when a call session has dropped or failed to establish and calculating the establishment success rate (ESR) and session drop rate (SDR) statistics on a per grid-zone basis using the location information in at least one of the following types of messages: Radio Resource Control (RRC) Connection Request, RRC Connection Setup Complete, RRC Connection Release Complete, RRC Cell Update, RRC Radio Bearer Release Complete. Further, the geographical grid may cover substantially all the layers in the cellular network.

In another embodiment, a method of processing cellular network communications is provided. The method includes creating a geographical grid covering two or more layers in a cellular network, wherein a layer is defined as a unique combination comprising a cellular technology paired with a carrier frequency and the geographical grid is divided into a plurality of grid-zones. Data is collected for each of the layers within the cellular network grid from a plurality of user equipments and stored in a network map database. While a particular user equipment is in a connected state, a decision is made to handover a session to another cellular technology or to another carrier frequency based at least on a measurement report that triggers a mobility algorithm. Geographical location information for the particular user equipment is obtained from the measurement report. The geographic location information for the particular user equipment is mapped to a particular grid-zone in the geographical grid. The data stored in said database for the particular grid-zone is used to select a cell to start "compressed-mode" measurements or for handover.

Optionally, with regard to the preceding embodiment, the cellular network technologies may comprise Wideband Code Division Multiple Access and/or 4G Long Term Evolution. Further, the data collected may include radio measurements and historical network key performance indicator (KPI) statistics on a per grid-zone basis per technology and carrier frequency. Additionally, the geographical grid may cover substantially all the layers in the cellular network.

In yet another embodiment a method of processing cellular network communications is provided. The method includes creating a geographical grid covering two or more layers in a cellular network, wherein a layer is defined as a unique combination comprising a cellular technology paired with a carrier frequency and the geographical grid is divided into a plurality of grid-zones. Data is collected for each of the layers within the cellular network grid from a plurality of user equipments and stored in a network map database. When a particular user equipment is going into a connected state or when performing service establishment with a particular user equipment, a decision is made to redirect a call session for the particular user equipment to a different cellular technology or to different carrier frequency based at least on a Radio Resource Control (RRC) Connection Request message including geographical location information for the particular user equipment. The geographical location information for the particular user equipment reported in the RRC Connection Request message is mapped to a particular grid-zone in the geographical grid. The data stored in the database for the particular grid-zone is used to select a target cell to redirect the call session.

Optionally, with regard to the preceding embodiment, the cellular network technologies may comprise Wideband Code Division Multiple Access and/or 4G Long Term Evolution, Further, the data collected may include radio measurements and historical network key performance indicator (KPI) statistics on a per grid-zone basis per technology and carrier frequency, Additionally, the geographical grid may cover substantially all the layers in the cellular network.

In yet another embodiment a method of processing cellular network communications is provided. The method includes creating a geographical grid covering two or more layers in a cellular network, wherein a layer is defined as a unique combination comprising a cellular technology paired with a carrier frequency and the geographical grid is divided into a plurality of grid-zones. Data is collected for each of the layers within the cellular network grid from a plurality of user equipments and stored in a network map database. When a particular user equipment is going into an idle state as a result of a session release procedure, geographic location information for the particular user equipment reported during the session release procedure is mapped to a particular grid-zone in the cellular network grid. The data stored in the database for the particular grid-zone is used to select the cell to redirect the particular user equipment to.

Optionally, with regard to the preceding embodiment, the cellular network technologies may comprise Wideband Code Division Multiple Access and/or 4G Long Term Evolution. Further, the data collected may include radio measurements and historical network key performance indicator (KPI) statistics on a per grid-zone basis per technology and carrier frequency. Additionally, the geographical grid may cover substantially all the layers in the cellular network.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
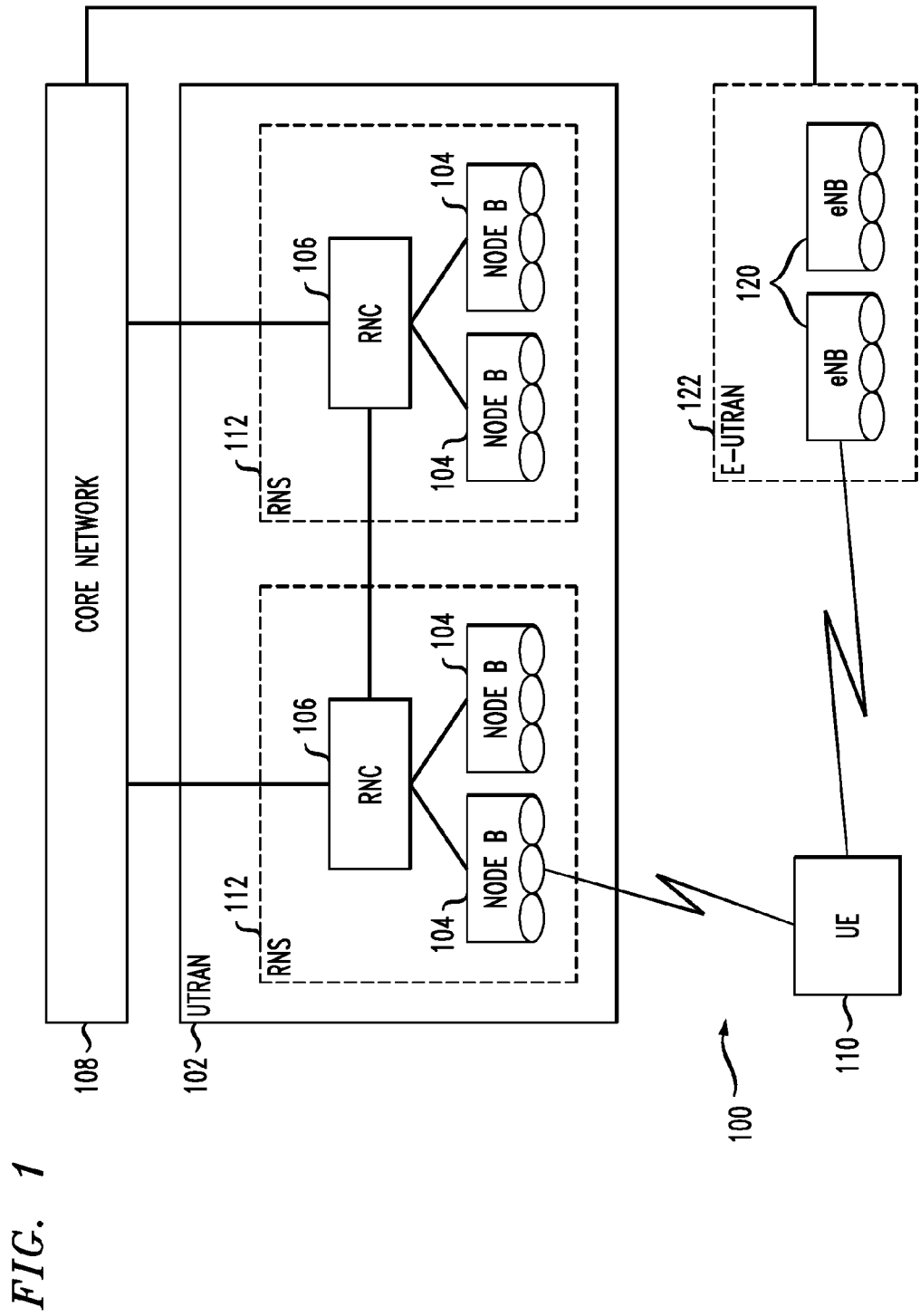
FIG. 1 is a block diagram of an exemplary communications system suitable for implementing aspects of the present invention.

Referring now to the drawings wherein the showings are for purposes of illustrating the exemplary embodiments only and not for purposes of limiting the claimed subject matter, FIG. 1 shows an exemplary communication system 100 in accordance with aspects of the present invention.

As described herein, the communication system 100 generally includes a radio access network 102 such as the Universal Terrestrial Radio Access Network (UTRAN). UTRAN is a collective term for the Node Bs 104 and Radio Network Controllers (RNCs) 106 that make up the Universal Mobile Telecommunications System (UMTS) radio access network. UMTS is an umbrella term for the third generation (3G) radio technologies developed within 3GPP. The radio access specifications provide for Frequency Division Duplex (FDD) and Time Division Duplex (TDD) variants, and several chip rates are provided for in the TDD option, allowing UTRA technology to operate in a wide range of bands and co-exist with other radio access technologies. UMTS includes the original W-CDMA scheme.

The radio access network 102 connects to the core network 108, which is an evolution from the GSM core. This communications network can carry many traffic types from real-time circuit-switched to IP-based packet-switched. The UTRAN 102 allows connectivity between the user equipment (UE) 110 and the core network (CN) 108.

More particularly, the UTRAN 102 includes a number of base stations, which are generally called Node Bs 104, and Radio Network Controllers (RNC) 106. The RNC 106 provides control functionalities for one or more Node Bs 104.

The RNC 106 and its corresponding Node Bs 104 make up the Radio Network Subsystem (RNS) 112. There can be more than one RNS present in a UTRAN.

The RNS 112 can be either a full UTRAN or only a part of a UTRAN An RNS offers the allocation and release of specific radio resources to establish means of connection in between the UE 110 and the UTRAN 102. A Radio Network Subsystem 112 generally contains one RNC and is responsible for the resources and transmission and reception in a set of cells.

The user equipment (UE) 110 may take the form of any of a variety of mobile devices, including cellular phones, smartphones, personal digital assistants (PDAs), laptop computers, tablet computers, digital pagers, wireless cards, and any other device capable of accessing a data network through the base station 104.

Generally, the RNC 106 operates to control and coordinate the base stations 104 to which it is connected. The RNC 106 of FIG. 1 generally provides replication, communications, runtime, and system management services. The RNC 106, in the illustrated embodiment handles call processing functions, such as setting and terminating a call path and is capable of determining a data transmission rate on the forward and/or reverse link for each UE 110 and for each sector supported by each of the base stations 104.

The UE 110 communicates with multiple Node Bs 104. The Node B 104 is a base station responsible for physical layer processing such as forward error correcting coding, modulation, spreading, and conversion from baseband to RF signal transmitted from antenna. The Node B 104 can handle transmission and reception from one to several cells. One RNC may controls multiple (up to thousands) Node Bs.

FIG. 1 also shows that the UE 110 may be connected to an E-UTRAN (Evolved UTRAN) 120 instead of the UTRAN 102. 3GPP also developed Long Term Evolution (LTE), which evolves from UMTS and GSM. It is also noted that the E-UTRAN Node B 122, also known as Evolved Node B and abbreviated as eNode B or eNB, is the element in E-UTRAN 120 of LTE that is the evolution of the element Node B in UTRAN of UMTS. Traditionally, a NodeB has minimum functionality (except HSPA), and is controlled by an RNC. However, with an eNodeB, there is no separate controller element. This simplifies the architecture and allows lower response times.

Generally the CN 108 operates as an interface to a data network (not shown) and/or to a publicly switched telephone network (PSTN) (not shown). The CN 108 performs a variety of functions and operations, such as user authentication, however, a detailed description of the structure and operation of the CN 108 is not necessary to an understanding and appreciation of the instant invention. As such, further details of the CN 108 are not presented herein.

Thus, those skilled in the art will appreciate that the communications system 100 facilitates communications between the UE 110 and the data network and the PSTN. It should be understood, however, that the configuration of the communications system 100 of FIG. 1 is exemplary in nature and that fewer or additional components may be employed in other embodiments of the communications system 100 without departing from the spirit and scope of the instant invention.

Cellular sites are what the user equipment "talks" to. They include one or more transmit and receive antennas. Each antenna covers a particular geographical area. A wireless service provider may only have one cell site in a small community, whereas they may have hundreds or even thousands of cell sites in a large urban center.

A mobile network operator (also known as a wireless service provider, wireless carrier, cellular company, or mobile network carrier) is a provider of wireless communications services that owns or controls the elements necessary to sell and deliver services to an end user including radio spectrum allocation, wireless network infrastructure, back haul infrastructure, billing, customer care and provisioning computer systems and marketing, customer care, provisioning and repair organization.

Cells may provide coverage in a radius around a tower or base station (or in a sectorized deployment, which is more common). Users of cell phones within that radius are able to access wireless services. The distance that the radius covers is determined by the power output of the cell site, the amount of background noise, and other environmental interferences, among other things. In a real environment, cells do not provide radial coverage due to geographical features and interference from buildings. Places that have a relatively flat terrain and equipped with omni-directional antenna will have cells that radiate near-perfect circles of coverage. Cell towers in locations with rough terrain or large man-made objects (e.g., buildings) may have distorted cell coverage.

The exemplary embodiment utilizes geographical location information associated with the user equipment 100 to assist in the selection of a target cell during handover and redirection procedures. This process involves defining a network grid to aid in building a database of captured data from the user equipment 100, such as radio measurements and KPI statistics per geographical location, and then using such data for making mobility decisions.

Unless specifically stated otherwise, or as is otherwise apparent from the discussion, terms such as "processing" or "computing" or "calculating" or "determining" or "displaying" or "predicting" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

The term "location" as used herein refers to the geographical location of the user equipment, which can also be referred to as geolocation. Geolocation may be described with a geographic coordinate system, using the ellipsoid point Latitude and Longitude (see 3GPP Specification 23.032). This new network functionality uses geolocation information to refine the location-dependent mobility decision criteria while selecting the target cell and the technology, for example, (a) during a connected state, (b) while going into a connected state or performing service establishment, or (c) going into an idle or non-connected state.

Mobility decision criteria that depend on the location of the user equipment within the cell coverage area may include, for example, (1) radio measurements and (2) historical KPI statistics.

Radio measurements may include, for example, one or more of the energy per chip divided by the total in-band interference (or the Ec/No) of the common pilot channel (or CPICH), the received signal code power (RSCP) of the CPICH reference signal for the W-CDMA network, and the received power (RSRP), and the reference signal receive quality (RSRQ) for the LTE network. Of course, it is to be understood that other types of radio measurements may be used as well.

Historical KPI statistics may include, for example, one or more of the establishment success rate (ESR) and the session drop rate (SDR). Of course, it is to be understood that other types of KPI statistics may be used as well.

Use of the geographic location of the user equipment 110 provides a more granular view than only using the cell information, thus enabling a more accurate target cell selection procedure.

Figure 2:
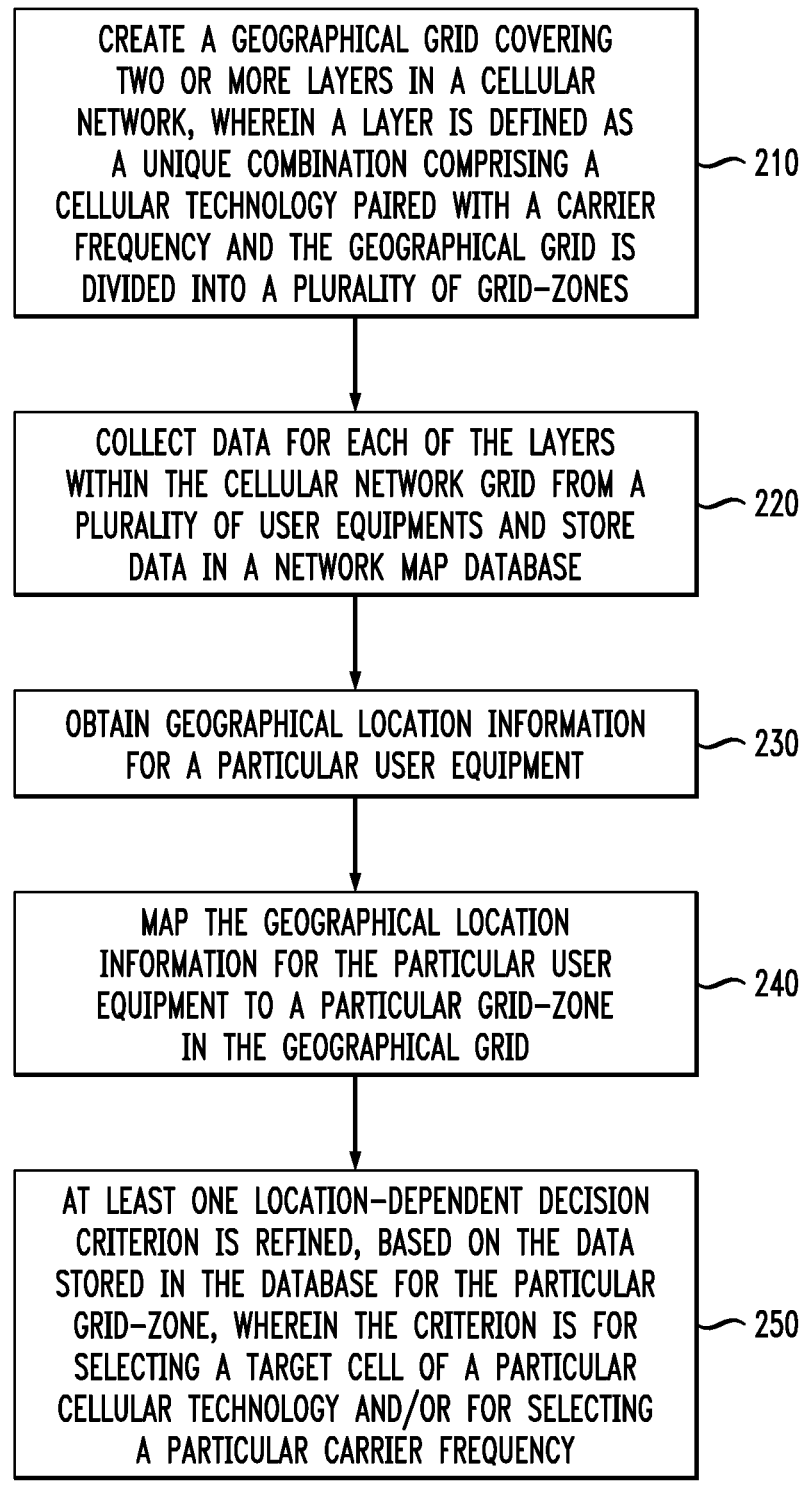
FIG. 2 is a flow chart of an exemplary method of using the geographical location of user equipment to assist in the selection of a target cell in accordance with aspects of the present invention.

With reference to FIG. 2, the exemplary method includes creating a geographical grid covering the layers in a cellular network (210). It is noted that a cellular network may include multiple technologies, with each technology including multiple carrier frequencies. For example, a given cellular network may incorporate LTE and W-CDMA technologies, each having multiple carrier frequencies. Each of the unique technology and carrier frequency pairs is also called a layer.

Figure 3:
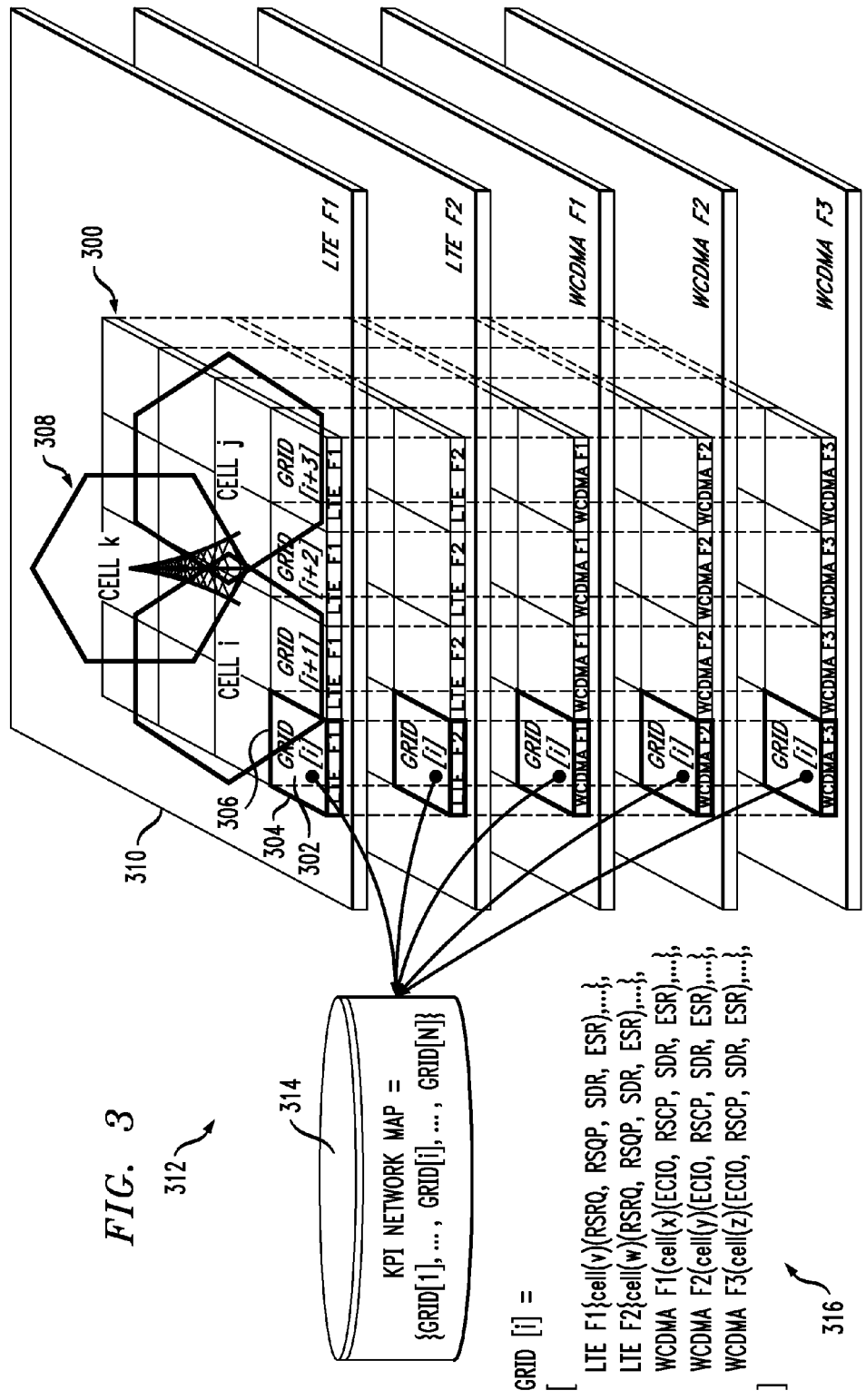
FIG. 3 shows a perspective view of a cellular network featuring layers of different cellular technologies and carrier frequencies along with the grid and the grid-zones with the associated database and its entries in accordance with aspects of the present invention.

An exemplary network grid 300 is shown in FIG. 3. The grid 300 includes a number of grid-zones 302 (e.g., grid-zone i, grid-zone i+1, grid-zone i+2, grid-zone i+3, and so on) formed by the intersection of vertical gridlines 304 and horizontal gridlines 306 over a cellular network map 308 (e.g., cell i, cell j, cell k, and so on). By way of example, the grid-zone 302 could be a square having a size that is approximately 0.001373 degrees. It is to be understood, however, that other sizes and shapes, such as rectangles, could be utilized. For example, the index of the grid-zone 302 may be the southeast corner of the grid-zone (in the Northern Hemisphere), and it may be calculated as follows:

Latitude: reported degreesLatitude Mod 128
Longitude: reported degreesLongitude Mod 64

The process may be repeated for each layer 310 (e.g., LTE F1, LTE F2, W-CDMA F1, W-CDMA F2, W-CDMA F3, and so on) in the cellular network 312.

Next, data for each of the layers 310 and/or grid-zones (or locations) 312 within the cellular network 310 is collected, and calculated if necessary, and then stored in a network map database 314 (220). An exemplary matrix 316 for a given grid-zone [i] is shown in FIG. 3.

Such information may include, but is not limited to, radio measurements, such as Ec/Io, RSCP, RSRP, and RSRQ, and historical KPI statistics, such as ESR and SDR.

3GPP generally supports gathering radio measurements per location through Measurement Reports. The radio measurements part of the network map or database is built using dedicated measurement procedures for this purpose, and data reported in the measurement reports for Radio Resource Management purposes, for each of the technology carriers independently.

The Radio Resource Control (RRC) protocol belongs to the 3GPP protocol stack and handles the control plane signaling of Layer 3 between the UEs (User Equipment) 110 and the UTRAN 102 or the E-UTRAN 120. An additional location parameter may be included in the following RRC messages to receive the location information when the session has dropped or failed to establish, and subsequently to calculate the ESR and SDR statistics on a per grid-zone basis using the location information in the messages:

RRC Connection Request
RRC Connection Setup Complete
RRC Connection Release Complete
RRC Cell Update
RRC Radio Bearer Release Complete The grid 300 of every layer 310 is built using the measurements received from the UE 110 on that layer. The data may be collected from a plurality of UEs 110 in real time or for one or more specified time periods.

Finally, the exemplary embodiment includes making mobility and load-balancing decisions for the user equipment based on the geographical location of the user equipment 110 and the collected data for the grid. In this regard, geographical location information for a particular user equipment is obtained (230). The geographical location information for the particular user equipment is mapped to a particular grid-zone in the geographical grid (240). At least one location-dependent decision criterion is refined, based on the data stored in the database for the particular grid-zone, wherein the criterion is for selecting a target cell of particular cellular technology and/or for selecting a particular carrier frequency (250).

Thus, geolocation information is used to refine the location-dependent decision criteria while selecting the target cell and the particular technology and carrier frequency. This process involves at least three scenarios.

In one scenario, selection of the better target cell while in the connected state begins with a measurement report triggering a mobility algorithm that decides to handover the session to another cellular technology or to another carrier frequency. The location information reported in the message is mapped to a particular grid-zone 302 in the grid 300, and the radio measurements and KPI statistics for that grid-zone 302 are used (in addition to other criteria) to select the cell either to execute a handover procedure towards or to start the "compressed-mode" measurements, among other things. When there are many options for the target cell, limiting the measurements to one cell/carrier frequency reduces the handover time. Further, handover success rate is improved, since one of the better cells from the radio and KPI perspectives is selected.

Thus, the exemplary embodiment improves the accuracy and speed of selecting the target cell when handover or redirection has been decided and when there are many potential target cells in the network topology, while noting that at this time 3GPP limits user equipment to measure only two additional frequency division duplexing (FDD) carriers. This increases the success rate of handover and redirection procedures and therefore improves session establishment success rate and session drop rate.

In another scenario, selection of the most suitable target cell while going into a connected state or performing service establishment begins, for example, as a result of an RRC Connection Request message with location information (as mentioned above this is added to 3GPP), when the mobility algorithm decides to redirect the session to another technology or to another carrier frequency. The location information helps to determine the grid-zone 302 in the grid 300, and the radio measurements and KPI statistics for that grid-zone are used (in addition to other criteria) to select the cell to redirect the session. Other criteria could be the load in that cell that does not depend on the location of the UE 110 in the cell but solely based on the cell itself. Potentially a mobility profile can be adapted based on mobile trajectory and then used to predict mobile future trajectory. This generally eliminates the need of a twin cell. Further, when there are many candidates as the target cell, using the radio and KPI values of these potential target cells to select the target cell will improve the redirection success and thus session establishment success rate statistics.

In yet another scenario, selection of the most suitable target cell while going into idle state begins as a result of a session (e.g., RRC) release when the user equipment 110 is redirected to the best cell based on the KPI statistics. The geographical location information of the user equipment 110 is used in determining the target cell with better KPI statistics in that grid-zone. The geographical location information of the user equipment 110 reported during the session release procedure is mapped to a grid-zone 302 in the grid 300, and the radio measurements and KPI statistics for that grid-zone are used (in addition to other criteria) to select the cell to send the user equipment 110 to. When there are many candidate cells, selecting the target cell using their radio and KPI values will improve the success rate of the establishment of the next session.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing cellular network communications, the method comprising:
    creating a geographical grid covering two or more layers in a cellular network, wherein a layer is defined as a unique combination comprising a cellular technology paired with a carrier frequency and the geographical grid is divided into a plurality of grid-zones;
    collecting data for the layers within the cellular network grid from a plurality of user equipments and storing the data in a network map database;
    obtaining geographical location information for a first user equipment;
    mapping the geographical location information for the first user equipment to a first grid-zone in the geographical grid; and
    refining at least one location-dependent decision criterion, wherein said refining is based on said data stored in said database for the first grid-zone, and wherein said criterion is for selecting a target cell of a particular cellular technology and/or for selecting a particular carrier frequency.

2. The method of claim 1, wherein the cellular network technologies comprise at least Wideband Code Division Multiple Access and 4G Long Term Evolution.

3. The method of claim 1, wherein the data collected includes at least radio measurements and historical network key performance indicator (KPI) statistics on a per grid-zone basis per technology and carrier frequency.

4. The method of claim 1, further comprising:
    adding an additional location parameter in one or more signaling messages to carry the location information when a call session has dropped or failed to establish;
    calculating the establishment success rate (ESR) and session drop rate (SDR) statistics on a per grid-zone basis using the location information in at least one of the following types of messages: Radio Resource Control (RRC) Connection Request, RRC Connection Setup Complete, RRC Connection Release Complete, RRC Cell Update, RRC Radio Bearer Release Complete.

5. The method of claim 1, wherein the geographical grid covers substantially all the layers in the cellular network.

6. The method of claim 1, further comprising:
    selecting a target cell of a particular cellular technology.

7. The method of claim 1, further comprising:
    selecting a target cell of a particular carrier frequency.

8. The method of claim 1, further comprising:
    while a second user equipment is in a connected state, deciding to handover a session to another cellular technology or to another carrier frequency based at least on a measurement report that triggers a mobility algorithm;
    obtaining geographical location information for the second user equipment from the measurement report;
    mapping the geographic location information for the second user equipment to a second grid-zone in the geographical grid; and
    using the data stored in said database for the second grid-zone to select a cell to start "compressed-mode" measurements or for handover.

9. The method of claim 8, wherein the cellular network technologies comprise at least Wideband Code Division Multiple Access (W-CDMA) and 4G Long Term Evolution (LTE).

10. The method of claim 8, wherein the data collected includes at least radio measurements and historical network key performance indicator (KPI) statistics on a per grid-zone basis per technology and carrier frequency.

11. The method of claim 8, wherein the geographical grid covers substantially all the layers in the cellular network.

12. The method of claim 1, further comprising:
    when a third user equipment is going into a connected state or when performing service establishment with the third user equipment, deciding to redirect a call session for the third user equipment to a different cellular technology or to different carrier frequency based at least on a Radio Resource Control (RRC) Connection Request message with geographical location information for the third user equipment;
    mapping the geographical location information for the third user equipment reported in the RRC Connection Request message to a third grid-zone zone in the geographical grid; and
    using said data stored in said database for the third grid-zone to select a target cell to redirect the call session.

13. The method of claim 12, wherein the cellular network technologies comprise at least Wideband Code Division Multiple Access (W-CDMA) and 4G Long Term Evolution (LTE).

14. The method of claim 12, wherein the data collected includes at least radio measurements and historical network key performance indicator (KPI) statistics on a per grid-zone basis per technology and carrier frequency.

15. The method of claim 12, wherein the geographical grid covers substantially all the layers in the cellular network.

16. The method of claim 1, further comprising:
when a fourth user equipment is going into an idle state as a result of a session release procedure, mapping geographic location information for the fourth user equipment reported during the session release procedure to a fourth grid-zone in the cellular network grid; and
using said data stored in said database for the fourth grid-zone to select the cell to redirect the fourth user equipment to.

17. The method of claim 16, wherein the cellular network technologies comprise at least Wideband Code Division Multiple Access and 4G Long Term Evolution.

18. The method of claim 16, wherein the data collected includes at least radio measurements and historical network key performance indicator (KPI) statistics on a per grid-zone basis per technology and carrier frequency.

19. The method of claim 16, wherein the geographical grid covers substantially all the layers in the cellular network.

\* \* \* \* \*